US010922968B2

(12) United States Patent
Ahnfalk

(10) Patent No.: US 10,922,968 B2
(45) Date of Patent: Feb. 16, 2021

(54) METHOD AND SYSTEM FOR INDICATING TRAFFIC INFORMATION IN A VEHICLE

(71) Applicant: Zenuity AB, Gothenburg (SE)

(72) Inventor: Sten Henrik Ahnfalk, Kungsbacka (SE)

(73) Assignee: Zenuity AB, Göteborg (SE)

( * ) Notice: Subject to any disclaimer, the term of this patent is extended or adjusted under 35 U.S.C. 154(b) by 0 days.

(21) Appl. No.: 16/774,442

(22) Filed: Jan. 28, 2020

(65) Prior Publication Data

US 2020/0242926 A1 Jul. 30, 2020

(30) Foreign Application Priority Data

Jan. 30, 2019 (EP) ..................... 19154460

(51) Int. Cl.
 *G08G 1/09* (2006.01)
 *G08G 1/0962* (2006.01)
 *G08G 1/0967* (2006.01)

(52) U.S. Cl.
 CPC ....... *G08G 1/09623* (2013.01); *G08G 1/0967* (2013.01)

(58) Field of Classification Search
 CPC .................................................. G08B 1/09623
 USPC ............ 340/905, 907, 901, 988, 990, 995.2; 701/23, 25, 117, 301, 461, 468
 See application file for complete search history.

(56) References Cited

U.S. PATENT DOCUMENTS

| | | | |
|---|---|---|---|
| 2005/0137782 A1* | 6/2005 | Shinada | G08G 1/0965 701/117 |
| 2006/0220905 A1 | 10/2006 | Hovestadt | |
| 2009/0224942 A1 | 9/2009 | Goudy et al. | |
| 2010/0007523 A1* | 1/2010 | Hatav | G08G 1/166 340/901 |
| 2011/0153116 A1* | 6/2011 | Bedingfield, Sr. | B60Q 9/00 701/1 |
| 2016/0351051 A1 | 12/2016 | Murthy et al. | |
| 2018/0005526 A1 | 1/2018 | Sendhoff et al. | |

FOREIGN PATENT DOCUMENTS

DE 102010043696 A1 5/2012

OTHER PUBLICATIONS

Extended European Search Report dated Aug. 8, 2019 for European Application No. 19154460.0, 10 pages.

* cited by examiner

*Primary Examiner* — Tai T Nguyen
(74) *Attorney, Agent, or Firm* — Sage Patent Group

(57) ABSTRACT

A method for providing information about traffic regulations in a vehicle is disclosed. The method comprises identifying a road sign in a surrounding area of the vehicle (e.g. by means of a perception system of the vehicle). Further, the method comprises identifying a traffic regulation associated with the identified road sign, in a current jurisdiction of vehicle, and retrieving traffic regulation data comprising information about a set of predefined road signs and associated predefined traffic regulations in a predefined jurisdiction. Still further, the method comprises comparing the identified traffic regulation with the retrieved traffic regulation data in order to determine if the identified road sign is not comprised in the set of predefine road signs, or if the identified traffic regulation differs from the associated predefined traffic regulations.

14 Claims, 2 Drawing Sheets

METHOD AND SYSTEM FOR INDICATING TRAFFIC INFORMATION IN A VEHICLE

CROSS-REFERENCE TO RELATED APPLICATIONS

The present application for patent claims priority to European Patent Application Ser. No. 19154460.0, entitled "METHOD AND SYSTEM FOR INDICATING TRAFFIC INFORMATION IN A VEHICLE" filed on Jan. 30, 2019, assigned to the assignee hereof, and expressly incorporated herein by reference.

TECHNICAL FIELD OF THE INVENTION

The present invention relates to a system and method for providing traffic information to a driver of a motor vehicle.

BACKGROUND

More and more modern vehicle are equipped with various support systems to help the driver in the driving process. These systems are commonly referred to as Advanced Driver-Assistance Systems (ADAS) and serve the purpose of increasing road safety and to reduce the cognitive burden of the driver by providing various support functions.

ADAS receive inputs form various data sources such as radar, LiDAR, Global Navigation Satellite Systems (GNSS), cameras, other vehicles (Vehicle-to-Vehicle, V2V), network systems (cellular, Wi-Fi, etc.), and so on. Example features provided by ADAS include Adaptive Cruise Control (ACC), Anti-lock braking system, blind spot monitor, tire pressure monitoring, etc.

Generally, it is safe to say that if one is to operate a vehicle in a safe manner one should conform to traffic rules by for example not exceeding speed limits, not performing prohibited turns and not overtaking other vehicles in prohibited road segments. An example manner to attempt to ensure that a vehicle is driven in a lawful manner is to notify the driver of current speed limits, either by input from externally mounted cameras or from map data provided by a navigation system.

However, there is still a need for improvements in the art; in particular, there is a need for new and improved methods and systems for providing traffic information to an occupant of a motor vehicle.

SUMMARY OF THE INVENTION

It is therefore an object of the present invention to provide a method for providing traffic information to an occupant of a motor vehicle, a non-transitory computer-readable storage medium, a control device and a vehicle comprising such a control device, which alleviate all or at least some of the drawbacks of presently known systems.

This object is achieved by means of a method, a non-transitory computer-readable storage medium, a control device and a vehicle as defined in the appended claims. The term exemplary is in the present context to be understood as serving as an instance, example or illustration.

According to a first aspect of the present invention there is provided a method for providing information about traffic regulations in a vehicle. The method comprises identifying a road sign in a surrounding area/environment of the vehicle (e.g. by means of a perception system of the vehicle). Further, the method comprises identifying a traffic regulation associated with the identified road sign, in a current jurisdiction of vehicle determined/defined by a current geographical position of the vehicle, and receiving traffic regulation data comprising information about a set of predefined road signs and associated predefined traffic regulations in a predefined jurisdiction. Still further, the method comprises comparing the identified traffic regulation with the received traffic regulation data in order to determine if the identified road sign is comprised in the set of predefine road signs, or if the identified traffic regulation differs from the associated predefined traffic regulations. Then, if it is determined that the identified road sign is not comprised in the set of predefined road signs or that the identified traffic regulation differs from the predefined traffic regulations, the method comprises generating an output (visual, audio, tactile, etc.) comprising information about the identified traffic regulation for the identified road sign to a user of the vehicle.

Hereby presenting a method for outputting relevant traffic regulations information to a driver of the vehicle, preferably in real time, and in particular in situations where it is probable that the user is not aware of the applicable laws and regulations. Thus, by informing the driver of the applicable laws (an optionally the significance of a violation), it is possible to improve the overall road safety as vehicle drivers are more prone to obey traffic regulations if they are explicitly informed about them. As mentioned, preferably, the identified traffic regulations are output in real-time as the vehicle approaches and/or passes the road sign.

The present invention is at least partly based on the realization that a valuable aspect to consider when attempting to improve vehicle safety and more importantly, road safety, is to ensure that the driver of the vehicle is provided with relevant traffic rule information. In contrast to prior known methods, the inventive method filters out irrelevant information by cross-referencing with the legislation that the driver is most likely to be familiar with, and thereby reducing the chance of distracting the driver with unnecessary output. In more detail, the present inventor realized that there is a need for a solution that filters out irrelevant data in order to provide information that will induce a desirable driver behaviour in terms of road safety and at the same time does not generate unnecessary distractions. Therefore, by allowing the driver to pre-set or predefine a country/legislation of preference, the vehicle control system can be configured to only output traffic regulation information for approaching signs that are not present in the predefined country/legislation or where the traffic regulations (road rules) differ for the same road sign.

A road sign is in the present context to be interpreted as a sign arranged at the side of, on the surface of, or above roads to give instructions or provide information to road users, and includes free text signs, typographic signs, and pictographic signs, such as e.g. warning signs, priority signs, prohibitory signs, traffic lights, road surface markings, and so forth.

According to an exemplary embodiment of the present invention, the method further comprises determining a current geographical position of the vehicle by means of a Global Navigation Satellite System, GNSS, and the step of identifying a traffic regulation associated with the identified road sign is only performed if the current geographical position is outside of a geographical area defined by the predefined jurisdiction. In other words, the method comprises determining that the current geographical position of the vehicle is outside of a predefined jurisdiction defined by a predetermined geographical area, and identifying a traffic regulation associated with the identified road sign. This allows for avoiding unnecessary data transmission to and from the vehicle when it is highly likely that the driver is well aware of the traffic rules of the current geographical area.

Further, according to another exemplary embodiment of the present invention, the step of identifying a road sign in a surrounding area of the vehicle comprises identifying a road sign in a surrounding area of the vehicle by means of an image sensor. The image sensor may for example be a camera, such as e.g. a monocular camera, a stereo camera, cameras with night vision capability, etc. Naturally, the road sign may be identified by means of a plurality of image sensors.

Still further, according to yet another exemplary embodiment of the present invention, the step of identifying a road sign in a surrounding area of the vehicle comprises identifying a road sign in a surrounding area of the vehicle by means of map data. The map data may be in the form of a HD map comprising positional and factual information about various landmarks such as road signs. Thus, by knowing the position of the vehicle in the HD map (e.g. retrieved from a GNSS, such as e.g. GPS), one can identify any road signs in the surrounding area of the vehicle.

In accordance with another exemplary embodiment of the present invention, the step of identifying a road sign in a surrounding area of the vehicle comprises identifying a road sign in a surrounding area of the vehicle by means of telemetry data. Telemetry is in the present context to be understood as a wireless data transfer mechanism (e.g. using radio, ultrasonic, or infrared systems). Thus, the road sign may for example be identified by using a radio receiver arranged in the vehicle. The telemetry data may further comprise information about the traffic regulation associated with the identified road sign.

Further, in accordance with yet another exemplary embodiment of the present invention, the step of generating the output comprising information about the associated traffic regulation for the identified road sign to a user of the vehicle comprises generating an output comprising information about a significance (i.e. consequence) for a violation of the associated traffic regulation. Preferably the output is generated when the vehicle is approaching or while it is passing the identified road sign, such that the driver is aware of the consequences of violating the traffic regulation associated with the approaching road sign. In an example scenario, a driver may be approaching a prohibition sign, which is not present in the predefined "home country selection" of the vehicle. The prohibition sign may further include text or symbols in a language that the driver is not expected to understand. Accordingly, the method then includes informing the driver informing the driver about the associated traffic regulation and the significance of a violation thereof (e.g. by providing visual cues on the dashboard or infotainment system).

Moreover, the significance of a violation may be scaled, i.e. there are different levels of violation (e.g. how much you exceed a speed limit) and different repercussions associated to each level. The method may then include using vehicle data (e.g. current speed, axle weight, number of vehicle occupants, etc.) in order to determine a severity of the violation. Thus, in accordance with yet another exemplary embodiment of the present invention the method further comprises retrieving vehicle data from a control unit of the vehicle, and wherein the information about a significance for a violation of the associated traffic regulation is based on the vehicle data. For example, if the vehicle is approaching or passing a "conditional" speed limit sign, i.e. that certain speed limits are applicable during certain times of the day.

Then the method includes retrieving vehicle data (e.g. current speed of the vehicle) and, if the vehicle speed is greater than the speed limit, to output information about the potential fine that, based on the current speed of the vehicle, the driver is currently exposed to. Thus, depending on the current vehicle speed, the information will be different as the associated fines are assumed to different depending on how much one exceeds the speed limit.

The vehicle data may for example comprise at least one of a velocity of the vehicle, number of passengers in the vehicle, weight of the vehicle, height of the vehicle, length of the vehicle, width of the vehicle, a geographical position of the vehicle, and a steering input.

Further, in accordance with a second aspect of the present invention, there is provided a non-transitory computer-readable storage medium storing one or more programs configured to be executed by one or more processors of a vehicle control system, the one or more programs comprising instructions for performing the method according to any one of the above discussed embodiments with respect to the first aspect of the invention. With this aspect of the invention, similar advantages and preferred features are present as in the previously discussed first aspect of the invention.

In accordance with a third aspect of the present invention, there is provided a control device comprising at least one processor, at least one memory, at least one sensor interface, and at least one communication interface. The processor is configured to execute instructions stored in the memory to perform a method for providing information about traffic regulations in a vehicle, wherein the method comprises receiving sensor data (via the at least one sensor interface) in order to identify a road sign in a surrounding area of the vehicle, identifying a traffic regulation associated with the identified road sign, in a current jurisdiction determined by a current geographical position of the vehicle. The method further comprises receiving (via the at least one communication interface) traffic regulation data comprising information about a set of predefined road signs and associated predefined traffic regulations in a predefined jurisdiction, and comparing the identified traffic regulation with the received traffic regulation data in order to determine if the identified road sign is not comprised in the set of predefine road signs, or if the identified traffic regulation differs from the associated predefined traffic regulations. Moreover, if it is determined that the identified road sign is not comprised in the set of predefined road signs or that the identified traffic regulation differs from the predefined traffic regulations, the method includes generating an output comprising information about the identified traffic regulation for the identified road sign to a user of the vehicle. With this aspect of the invention, similar advantages and preferred features are present as in the previously discussed first aspect of the invention. Furthermore, some or all of the method steps may be executed by a processor internally in a vehicle, by an external processor of an external entity (e.g. cloud based solution), or a combination thereof.

Yet further, in accordance with yet a fourth aspect of the present invention, there is provided a vehicle comprising a control device according to any embodiment of the above-discussed third aspect of the present invention. With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF FIGURES

For exemplifying purposes, the invention will be described in closer detail in the following with reference to embodiments thereof illustrated in the attached drawings, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. Even though the following disclosure may be more directed towards vehicles in the form of cars, the invention is applicable in other types of road vehicles such as busses, trucks, etc.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
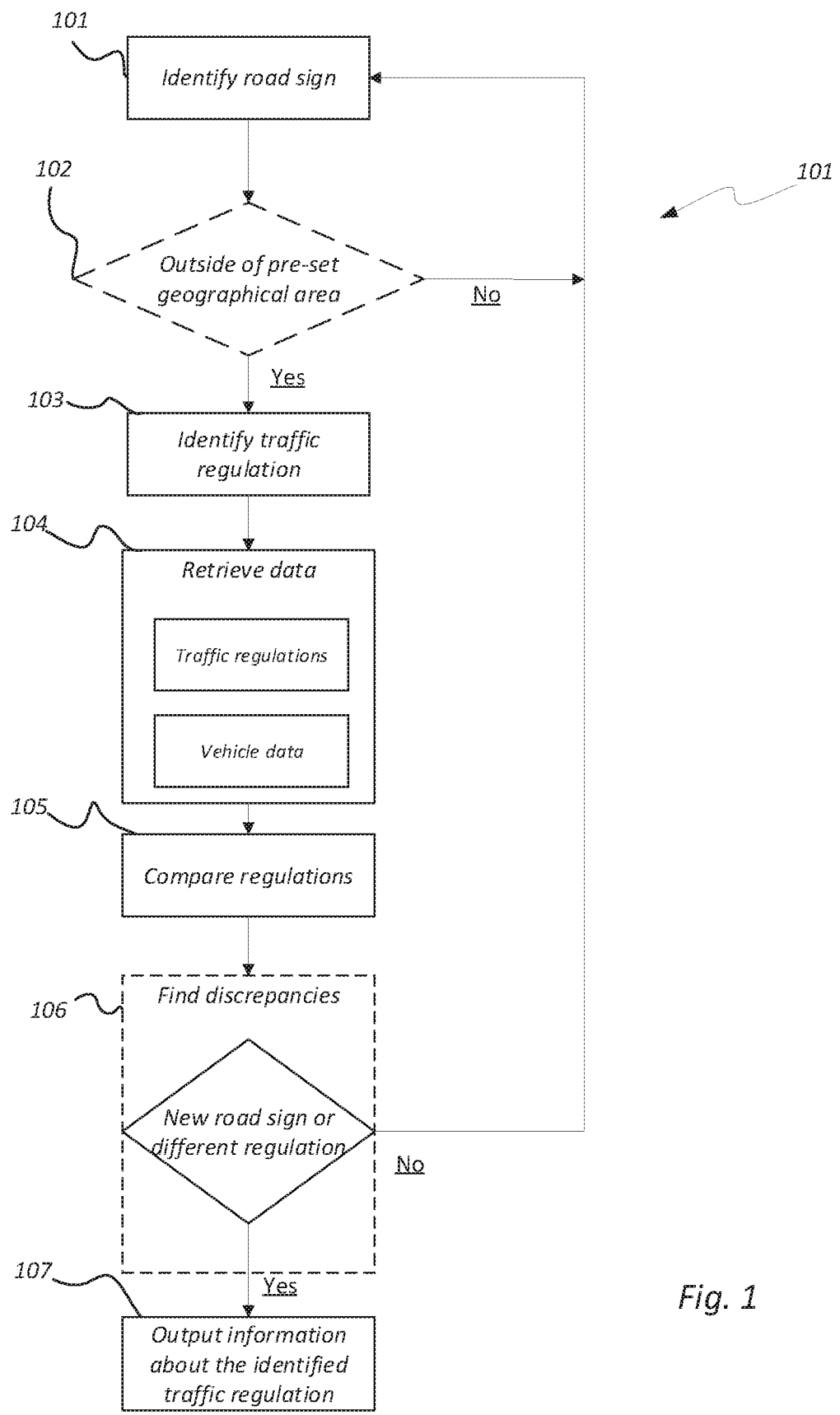
FIG. 1 is a flow-chart representation of a method for providing information about traffic regulations in a vehicle according to an embodiment of the present invention.

FIG. 1 illustrates a flow-chart representation of a method 100 for providing information about traffic regulations in a vehicle. The method comprises a step of identifying 101 a road sign in a surrounding area/environment of the vehicle. The road sign may be identified by means of suitable automotive grade sensors or supporting systems of the vehicle such as e.g. image sensors, or by means of HD map data or telemetry data. A road sign is in the present context to be interpreted as a sign arranged at the side of, on the surface of, or above roads to give instructions or provide information to road users and includes free text signs, typographic signs, and pictographic signs. The surrounding area may be defined as the surrounding space of the vehicle that is within the observable area (may be referred to as a viewing frustum) of the vehicle sensor system.

As readily appreciated by the skilled reader, the step of identifying 101 the road sign may comprise a step of running a pattern recognition model which analyses an image of the road sign and performs an automated recognition of patterns and regularities in the image data in order to classify the data into different categories. The pattern recognition model may be based on a deep learning algorithm and employed locally in the vehicle or as a cloud computing solution where the vehicle feeds the image data to an external resource which performs the image recognition and sends the result back to the vehicle.

Next, the method 100 comprises identifying 103 a traffic regulation associated with the identified road sign (e.g. retrieved from a local or remote data repository), in a current jurisdiction. The current jurisdiction is defined by a current geographical position of the vehicle. For example, if road sign is identified in Sweden, then the traffic regulation as defined by Swedish regulations and laws is used.

Further, the method 100 comprises retrieving/receiving/obtaining 104 traffic regulation data comprising information about a set of predefined road signs and associated predefined traffic regulations in a predefined jurisdiction. The method 100 may further comprise a step of setting a preferred country or state (i.e. jurisdiction) of the vehicle driver or user, where the preferred jurisdiction is construed as the "predefined jurisdiction".

The step of setting a preferred jurisdiction may for example comprise retrieving a driver/user profile from a remote or local database. Thereby the vehicle may be automatically configured according to a user preference without any interaction required by the driver/user. A preferred jurisdiction of the driver/user may for example be retrieved from a handheld device (e.g. smartphone) of the driver/user via wireless connection (e.g. Bluetooth) between the vehicle and the handheld device. However, in an alternative embodiment, the step of setting a preferred jurisdiction may comprise retrieving a driver/user profile based on user input (e.g. the driver selecting his preferred jurisdiction via a user interface provided in the vehicle).

The preferred jurisdiction may for example be a country of residency of the driver/user. Moreover, the vehicle may be factory pre-set to a specific legislation, such as e.g. to the one of the country/state that the vehicle is sold in.

Accordingly, the method 100 may comprise a step of determining a current geographical position of the vehicle. This may for example be done by means of a Global Navigation Satellite System, GNSS. Furthermore, a check 102 may be performed, where the step of identifying a traffic regulation associated with the identified road sign is only performed if the current geographical location of the vehicle is outside of a geographical area defined by the predefined jurisdiction. In other words, the associated traffic regulation is only checked if the vehicle is driven outside of the predefined jurisdiction (e.g. in a different country).

It is assumed that a driver/user is more likely to be unaware of the applicable laws and rules in foreign countries than his/her home country. Thus, the driver of the vehicle is not overwhelmed by traffic regulation information that the driver is highly likely to be well aware of, thereby providing for an efficient Human-Machine-Interface (HMI). An additional advantage that is obtainable by checking 102 if the vehicle is outside of a preset jurisdiction is that unnecessary data transmission between the vehicle and a remote server can be avoided.

Further, the identified traffic regulation (associated with the identified road sign) is compared 105 with the retrieved 104 traffic regulation data (associated with the jurisdiction of preference). In other words, the method comprises comparing the identified 103 traffic regulation and the identified 101 road sign with the retrieved 104 traffic regulation data. The comparison serves the purpose of determining 106 if the identified road sign is not comprised in the set of predefined road signs (i.e. determining if the road sign is novel), or if the identified traffic regulation differs from the corresponding predefined traffic regulations (i.e. finding a discrepancy/disparity between the legislations). If it is determined that the identified road sign is novel (i.e. that is it is a road sign not present in the predefined jurisdiction of the driver) or that the associated regulation is different from the predefined traffic regulations, then an output is generated 107 informing the driver about the identified traffic regulation for the identified road sign.

The output may further comprise information about a significance for a violation of the associated traffic regulation. By further informing the driver of e.g. the potential penalty fee associated with a particular violation, the driver may be further motivated to conform to the applicable traffic rules wherefore the overall road safety may be further improved.

Preferably, the output is generated in real-time, i.e. when the vehicle is approaching or while it is passing the identified road sign, such that the driver is aware of the consequences of violating the traffic regulation associated with the approaching road sign. In an example scenario, a driver may be approaching a prohibition sign, which is not present in the driver's jurisdiction of preference (i.e. the predefined jurisdiction). The prohibition sign may for example be conditional and include text or symbols in a language that the driver does not understand. Accordingly, the method then allows for informing the driver informing the driver about the associated traffic regulation and the significance of a violation thereof (e.g. by providing visual cues on the dashboard or infotainment system).

Moreover, the significance of a violation may be scaled, i.e. there are different levels of violation (e.g. how much one exceeds a speed limit) and different repercussions associated to each level. The method may then include using vehicle data (e.g. current speed, axle weight, number of vehicle occupants, etc.) in order to determine a severity of the pending violation.

The step of generating an output comprising information about the associated traffic regulation for the identified road sign to a driver/user of the vehicle comprising generating tactile feedback (e.g. vibrations that increase in magnitude depending on the severity of the violation). However, alternatively or additionally, the feedback may be in the form of visual feedback or audio feedback.

In other words, the described method 100 enables for an efficient and relevant HMI in vehicles, which allows the driver/user to be more focused on the road and surrounding environment instead of being forced to pay attention to irrelevant information. Irrelevant information may for example be an output comprising information about traffic regulations that the driver/user is very likely to already be familiar with (such as e.g. traffic regulations that are the same as in the country that the driver/user is a resident in). Another example of irrelevant information is traffic regulations which are not applicable in the current situation, and that the driver may not even come across (such as for example, that there is a rule regarding snow tires from December to March when it currently is July). Thus, the present invention allows for an optimized data flow, avoiding unnecessary data traffic and unnecessary distractions for the driver.

Further, according to an exemplary embodiment, the method 100 may comprise receiving user feedback on the generated output comprising information about the identified traffic regulation for the identified road sign to the driver of the vehicle. The user feedback may be provided by the driver or any other occupant of the vehicle. The method 100 may accordingly further comprise updating the traffic regulation data based on the user feedback. For example, by adding the identified traffic regulation for the identified road sign in a remote data repository comprising the traffic regulating data. This is advantageous to avoid presenting the same information an unnecessary amount of times to the driver, e.g. if the vehicle passes the same "unknown" sign several times. In more detail, the driver can then (e.g. by means of tactile input) provide feedback to the vehicle system that the identified traffic regulation for the identified road sign are considered to be "known" now. The traffic regulation data may be updated temporarily (e.g. for a predefined amount of time or while the vehicle is within that jurisdiction), or permanently.

Moreover, the method 100 may further include an optional step of retrieving 104 vehicle data from a control unit of the vehicle. Vehicle data may be one or more of a velocity of the vehicle, number of passengers in the vehicle, weight of the vehicle, height of the vehicle, length of the vehicle, width of the vehicle, a geographical position of the vehicle, and a steering input. Thus, the output comprising information about a significance for a violation of the associated traffic regulation may then be based on the vehicle data. For example, the identified road sign and traffic regulation may for example define a maximum weight limit of a bridge ahead, or a conditional speed limit (i.e. speed limits depend on day of the week and/or time of day). Then the information output can be based on the retrieved vehicle data (e.g. current vehicle speed, axle weight, etc.) so that the driver/user is informed in real time about what the potential consequences may be based on current vehicle data (e.g. based on the current speed of the vehicle, the potential fine for a speed limit violation can be calculated and provided to the driver in order to motivate a decrease in speed).

Figure 2:
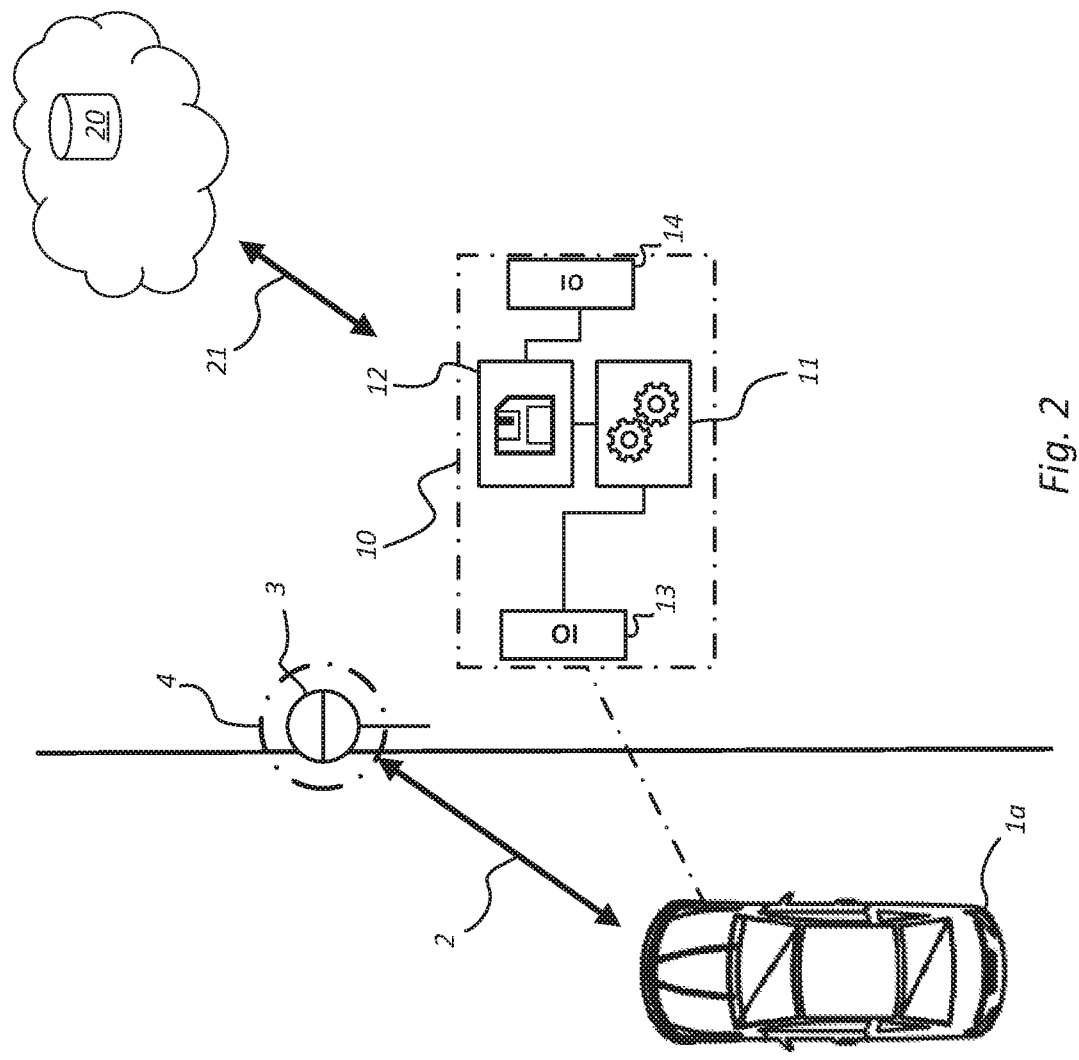
FIG. 2 is a schematic illustration of a control device arranged in a vehicle according to an embodiment of the present invention.

FIG. 2 shows a schematic top-view of a pair of vehicles 1a, 1b, here in the form of cars, on a road surface. One of the vehicles 1a, 1b, comprises a control device 10 that has a processor 11, a memory 12, and a sensor interface 13. The processor 11 is connected to each of the memory 12 and the sensor interface 13. The processor 11 is configured to execute instructions stored in the memory 12 to perform a method for providing information about traffic regulations in a vehicle. The method may for example comprise the steps according to any one of the embodiments of the method discussed in the foregoing. Moreover, optionally, depending on functionality provided in the control circuit 10 one or more communication/antenna interfaces 14 may be provided and furthermore, also additional sensor interfaces 13 may be provided for acquiring further data from sensors within the vehicle.

It should be appreciated that a communication/antenna interface 14 may also provide the possibility to acquire sensor data directly or via dedicated sensor control circuitry in the vehicle: for instance GPS data may be acquired through the antenna interface 14, some sensors in the vehicle may communicate with the control circuit 10 using a local network setup, such as CAN bus, I2C, Ethernet, optical fibers, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Moving on, according to an exemplary embodiment of the present invention the performed method comprises receiving sensor data (as indicated by the double-headed arrow 2) in order to identify (as indicated by the broken circle 4) a road sign 3 in a surrounding area/environment of the vehicle. Further, the method includes identifying a traffic regulation associated with the identified road sign 3. The traffic regulation is in reference to a current jurisdiction that is determined by a current geographical position of the vehicle.

Next, traffic regulation data is retrieved 21, where the traffic regulation data comprises information about a set of predefined road signs and associated predefined traffic regulations in a predefined jurisdiction. The traffic regulation data may for example be retrieved from a remote database 20 via one or more external networks. Cellular communication technologies can be used for long range communication such as to external networks. Examples of cellular radio technologies are GSM, GPRS, EDGE, LTE, 5G NR, and so on, also including future cellular solutions. However, in some solutions mid to short range communication technologies are used such as Wireless Local Area Network (WLAN), e.g. IEEE 802.11 based solutions.

The identified traffic regulation is then compared with the retrieved traffic regulation data in order to determine if the identified road sign is comprised in the set of predefine road signs, or if the identified traffic regulation differs from the associated predefined traffic regulations.

I an example scenario, the present invention may be advantageous when a person is to rent a vehicle in a foreign country. Here, it is likely that the rentee (i.e. the one who rents) is not aware of all applicable traffic regulations in the foreign country, and especially not the traffic regulations that are particular for that specific foreign country. Thus, the above presented invention allows the rentee to set or provide a "preferred country" which in turn defines a preferred jurisdiction, before entering traffic in the foreign country. Thereby, the "vehicle can aid" the driver to ensure that the driver is aware of all differentiating traffic regulations (and optionally the penalties of not conforming to the same), which increases the probability of compliance and should in general increase the road safety for the rentee and fellow road users. The country/legislation of preference may also be automatically retrieved by the control device via e.g. a Near Field Communication (NFC) protocol, such as Bluetooth, from a handheld device (e.g. smartphone) of the driver. Accordingly, the processor 11 may be further configured to receive a preferred jurisdiction that defines the predefined jurisdiction via the at least one communication interface.

The processor 11 (of the control device 10) may be or include any number of hardware components for conducting data or signal processing or for executing computer code stored in memory 12. The processor may comprise any number of modules for performing different operations. The control device 10 has as illustrated at least one computer readable storage medium or memory 12, and the memory 12 may be one or more devices for storing data and/or computer code for completing or facilitating the various methods described in the present description. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes/methods described herein.

The processor 11 may for instance be a microprocessor, digital signal processor, graphical processing unit (GPU), embedded processor, field programmable gate array (FPGA), or ASIC (Application specific integrated circuit). The storage unit 12 may be a volatile or non-volatile computer readable memory and arranged to store instructions or instruction sets for execution by the processor. Instruction sets are preferably stored in a non-volatile memory such as solid state (SSD) or disk drive storage, flash memory, or memory card. The storage unit 12 may also comprise a combination of storage types.

As briefly mentioned in the foregoing the control device 10 may be operably connected to other various other support systems (such as e.g. a localizations system or a perception system) of the vehicle. Moreover, the control device 10 is configured to acquire traffic regulation data, and optionally vehicle data, as outlined in the foregoing. Thus, it should be understood that the control device 10 may comprise a digital signal processor arranged and configured for digital communication with an off-site server or cloud based server. Accordingly, data may be sent to and from the control device 10. The geographical position of the vehicle is determined by means of the localization system, which may be realized as a GNSS, a system utilizing IMU data and road geometry, and/or through a system utilizing landmark measurements.

In summary, an advantage of the presented method and control device is that they allow and increased road safety in vehicles by for outputting (preferably in real-time) relevant traffic regulations information to a driver of the vehicle. Furthermore, the method and control circuit are arranged to generate traffic regulation information in situations where it is probable that the user is not aware of the applicable laws and regulations. By informing the driver of the applicable laws (an optionally the significance of a violation), it is possible to improve the overall road safety as vehicle drivers are more prone to obey traffic regulations if they are explicitly informed about them.

The presented solutions are particularly advantageous for semi-autonomous and manually driven vehicles.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Although the FIG. 1 may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for providing information about traffic regulations in a vehicle, the method comprising:
   identifying a road sign in a surrounding area of the vehicle;
   identifying a traffic regulation associated with the identified road sign, in a current jurisdiction determined by a current geographical position of the vehicle;
   receiving traffic regulation data comprising information about a set of predefined road signs and associated predefined traffic regulations in a predefined jurisdiction;
   comparing the identified traffic regulation with the received traffic regulation data in order to determine if the identified road sign is comprised in the set of predefined road signs, or if the identified traffic regulation differs from the associated predefined traffic regulations; and
   if it is determined that the identified road sign is not comprised in the set of predefined road signs or that the identified traffic regulation differs from the predefined traffic regulations, generating an output comprising information about the identified traffic regulation for the identified road sign to a driver of the vehicle.

2. The method according to claim 1, further comprising:
   determining the current geographical position of the vehicle by means of a Global Navigation Satellite System, (GNSS),
   wherein the step of identifying a traffic regulation associated with the identified road sign is only performed if the current geographical position is outside of a geographical area defined by the predefined jurisdiction.

3. The method according to claim 1, wherein the step of identifying a road sign in a surrounding area of the vehicle comprises identifying a road sign in a surrounding area of the vehicle by means of an image sensor.

4. The method according to claim 1, wherein the step of identifying a road sign in a surrounding area of the vehicle comprises identifying a road sign in a surrounding area of the vehicle by means of a map data.

5. The method according to claim 1, wherein the step of identifying a road sign in a surrounding area of the vehicle comprises identifying a road sign in a surrounding area of the vehicle by means of traffic sign telemetry data.

6. The method according to claim 1, wherein the step of generating the output comprising information about the associated traffic regulation for the identified road sign to the driver of the vehicle comprises generating an output comprising information about a significance for a violation of the associated traffic regulation.

7. The method according to claim 6, further comprising:
   receiving vehicle data from a control unit of the vehicle; and
   wherein the information about a significance for a violation of the associated traffic regulation is based on the vehicle data.

8. The method according to claim 7, wherein the vehicle data comprises at least one of a velocity of the vehicle, number of passengers in the vehicle, weight of the vehicle, height of the vehicle, length of the vehicle, width of the vehicle, a geographical position of the vehicle, and a steering input.

9. The method according to claim 1, wherein the step of generating an output comprising information about the associated traffic regulation for the identified road sign to the driver of the vehicle comprises generating a visual feedback comprising information about the associated traffic regulation for the identified road sign to the driver of the vehicle.

10. The method according to claim 1, wherein the step of generating an output comprising information about the associated traffic regulation for the identified road sign to the driver of the vehicle comprises generating an audio feedback comprising information about the associated traffic regulation for the identified road sign to the driver of the vehicle.

11. The method according to claim 1, wherein the step of generating an output comprising information about the associated traffic regulation for the identified road sign to the driver of the vehicle comprises generating a tactile feedback.

12. A non-transitory computer-readable storage medium storing one or more programs configured to be executed by one or more processors of a vehicle control system, the one or more programs comprising instructions for performing the method according to claim 1.

13. A control device comprising:
   at least one processor;
   at least one memory;
   at least one sensor interface;
   at least one communication interface;
   wherein the processor is configured to execute instructions stored in the memory to perform a method for providing information about traffic regulations in a vehicle, wherein the method comprises:
      receiving sensor data, via the at least one sensor interface, in order to identify a road sign in a surrounding area of the vehicle;
      identifying a traffic regulation associated with the identified road sign, in a current jurisdiction determined by a current geographical position of the vehicle;
      receiving, via the at least one communication interface, traffic regulation data comprising information about a set of predefined road signs and associated predefined traffic regulations in a predefined jurisdiction;
      comparing the identified traffic regulation with the received traffic regulation data in order to determine if the identified road sign is not comprised in the set of predefine road signs, or if the identified traffic regulation differs from the associated predefined traffic regulations; and
      if it is determined that the identified road sign is not comprised in the set of predefined road signs or that the identified traffic regulation differs from the predefined traffic regulations, generating an output comprising information about the identified traffic regulation for the identified road sign to a driver of the vehicle.

14. A vehicle comprising a control device comprising:
at least one processor;
at least one memory;
at least one sensor interface;
at least one communication interface;
wherein the processor is configured to execute instructions stored in the memory to perform a method for providing information about traffic regulations in a vehicle, wherein the method comprises:
receiving sensor data, via the at least one sensor interface, in order to identify a road sign in a surrounding area of the vehicle;
identifying a traffic regulation associated with the identified road sign, in a current jurisdiction determined by a current geographical position of the vehicle;
receiving, via the at least one communication interface, traffic regulation data comprising information about a set of predefined road signs and associated predefined traffic regulations in a predefined jurisdiction;
comparing the identified traffic regulation with the received traffic regulation data in order to determine if the identified road sign is not comprised in the set of predefine road signs, or if the identified traffic regulation differs from the associated predefined traffic regulations; and
if it is determined that the identified road sign is not comprised in the set of predefined road signs or that the identified traffic regulation differs from the predefined traffic regulations, generating an output comprising information about the identified traffic regulation for the identified road sign to a driver of the vehicle.

* * * * *